United States Patent
Stewart

(10) Patent No.: US 10,775,851 B2
(45) Date of Patent: Sep. 15, 2020

(54) MEMORY AID

(71) Applicant: Sara Stewart, Lone Tree, CO (US)

(72) Inventor: Sara Stewart, Lone Tree, CO (US)

(73) Assignee: Sara Stewart

( * ) Notice: Subject to any disclaimer, the term of this patent is extended or adjusted under 35 U.S.C. 154(b) by 0 days.

(21) Appl. No.: 16/371,651

(22) Filed: Apr. 1, 2019

(65) Prior Publication Data
US 2019/0302853 A1  Oct. 3, 2019

Related U.S. Application Data

(60) Provisional application No. 62/650,501, filed on Mar. 30, 2018.

(51) Int. Cl.
| | | |
|---|---|---|
| G06F 1/16 | (2006.01) | |
| G06F 3/02 | (2006.01) | |
| G06F 3/01 | (2006.01) | |

(52) U.S. Cl.
CPC ............ *G06F 1/1671* (2013.01); *G06F 1/163* (2013.01); *G06F 1/1656* (2013.01); *G06F 3/011* (2013.01); *G06F 3/0219* (2013.01)

(58) Field of Classification Search
None
See application file for complete search history.

(56) References Cited

U.S. PATENT DOCUMENTS

| | | | | |
|---|---|---|---|---|
| 4,078,660 A | * | 3/1978 | Lerro | A44C 5/003 128/897 |
| 4,847,818 A | * | 7/1989 | Olsen | H04B 1/385 368/10 |
| 5,020,039 A | * | 5/1991 | Yokote | G04C 3/001 224/165 |
| 5,704,067 A | * | 1/1998 | Brady | A41D 20/00 2/170 |
| 6,728,166 B2 | * | 4/2004 | Grupp | A44C 5/0015 368/204 |
| D617,231 S | * | 6/2010 | Adamson | D11/4 |
| 8,040,668 B1 | * | 10/2011 | Alkire, III | G06F 1/163 340/572.8 |
| 9,205,316 B2 | * | 12/2015 | Fishman | A63B 69/0028 |
| 2003/0111005 A1 | * | 6/2003 | Lord | G09F 19/00 116/307 |
| 2006/0179542 A1 | * | 8/2006 | Pierce | A44C 15/0025 2/170 |
| 2007/0297293 A1 | * | 12/2007 | DelValle | A44C 5/0015 368/223 |
| 2009/0156272 A1 | * | 6/2009 | Ohuchi | H04B 1/385 455/575.1 |

(Continued)

*Primary Examiner* — Daniel P Wicklund
*Assistant Examiner* — Christopher L Augustin
(74) *Attorney, Agent, or Firm* — Adsero IP

(57) ABSTRACT

A wearable memory aid or activity tracking device. The device includes a wristband having a plurality of buttons that may be manually articulated between first and second configurations or states to conveniently track the occurrence of events or to count activities. Activities or events may be tracked over any selected period of time, for example a day, a week, an hour, or other chronological time period. Alternatively, events may be tracked during an activity, for example, while at the gym, after school, during a golf hole, or the like. The device is suitable for use by people of any age.

15 Claims, 8 Drawing Sheets

(56) References Cited

U.S. PATENT DOCUMENTS

| | | | | |
|---|---|---|---|---|
| 2012/0324945 A1* | 12/2012 | Koeppel | .............. | A44C 5/0015 |
| | | | | 63/1.13 |
| 2013/0070452 A1* | 3/2013 | Urano | .................... | H05K 1/181 |
| | | | | 362/231 |
| 2013/0106603 A1* | 5/2013 | Weast | ...................... | A61B 5/11 |
| | | | | 340/539.11 |
| 2016/0209876 A1* | 7/2016 | Park | ...................... | G06F 1/1652 |
| 2017/0372565 A1* | 12/2017 | Do | ....................... | A44C 5/0015 |

* cited by examiner

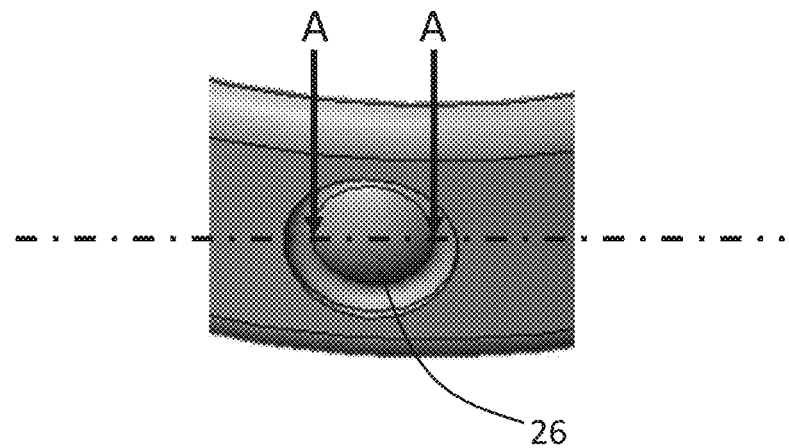
*Fig. 4A*
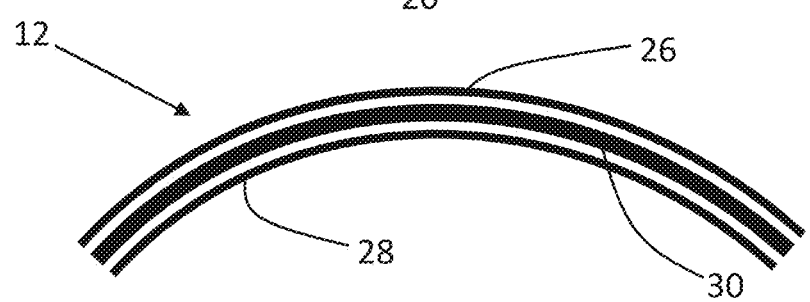
Section A – A, initial state     *Fig. 4B*
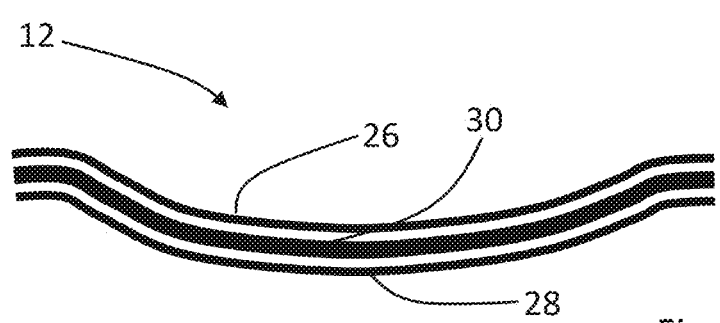
Section A – A, secondary state     *Fig. 4C*

MEMORY AID

CROSS-REFERENCES TO RELATED APPLICATIONS

This application claims the benefit of U.S. Patent Application Ser. No. 62/650,501 (the '501 application), filed Mar. 30, 2018 by Sarah Stewart, entitled, "MEMORY AID," the entire teachings of which are incorporated herein by reference in its entirety for all purposes.

TECHNICAL FIELD

Certain embodiments disclosed herein are directed toward a wearable memory aid. More specifically, device embodiments include a wristband having a plurality of buttons that may be articulated between a first state and a second state by a user to track the occurrence of events during a period of time or during an activity. Upon completion of the time period or activity, the user may reset any buttons previously articulated to the second state back to the first state. Thus, the memory aid serves to help the user remember to complete tasks, develop good habits, count events and the like.

BACKGROUND

People must remember to accomplish several tasks each day. It is sometimes difficult to remember which tasks have been completed and which remain to be done. For example, an adult may need to remember to take required medications several times a day. Children might be asked to remember to complete their homework, feed the family dog, and pick up their rooms, before they are allowed play time.

People also must count the occurrence of discrete events or milestones as certain activities are performed. For example, a golfer must count the strokes taken during each hole of a round of golf. Others may desire to count repetitions at the gym, count laps around the pool, or count the number of glasses of water consumed each day during a diet. Each of these quite different activities shares one key attribute; during the relevant activity, or during the applicable time period, the activity or event is either completed or not completed.

Devices of greater and lesser complexity are known to help people remember and track activities such as those noted above. For example, sophisticated wristwatches may track repetitions at the gym or laps around a pool. Golf computers can be programmed to record the number of shots taken on each hole. Relatively complex computerized pill dispensers can be programmed to track medication consumption. Alternatively, simple medication dispensers may include indicia on the dispenser to help a user remember if a medication has been taken. Other simple devices such as calendars, to-do lists, or handwritten notes may be used as reminders and to track the completion of selected tasks. These and other known memory aids or event tracking/counting devices can be complicated, expensive, or not particularly easy or convenient to use.

The embodiments disclosed herein are directed to overcoming one or more of the problems detailed above.

SUMMARY OF THE EMBODIMENTS

One embodiment disclosed herein is a wearable memory aid or activity tracking device. The device includes a wristband having a plurality of buttons that may be manually articulated between first and second configurations or states to conveniently track the occurrence of events or to count activities. Activities or events may be tracked over any desired period of time, for example a day, a week, an hour, or another chronological time period. Alternatively, events may be tracked during an activity, for example, while at the gym, after school, during a golf hole, or the like. The memory aid device is suitable for use by people of any age.

During use, a user may articulate a button from the first state to the second state to represent an activity, event, or task being completed. Alternatively, articulating a button from the first state to the second state can represent a milestone being achieved or an event being counted. After the time period or activity is completed, the user may reset buttons from the second state to the first state as desired. Thus, the device serves as a simple, wearable, easy to use memory aid. The device may be used to track any type of event, series of events, task, or milestone, without limitation.

For example, an adult user may need to remember to take required medications several times a day. Children might be asked to remember to complete their homework, feed the family dog, and pick up their rooms, before they have play time. A golfer must count the strokes taken during each hole of a round of golf. Others may desire to count repetitions at the gym, count laps around the pool, or count the number of glasses of water consumed each day during a diet. The device may be used to track, count, or otherwise remind the user of the status of any activity, event, or task being undertaken. For example, the user may wear the device as a wristband, and the press one button each time a task is completed, a golf stroke is made, a glass of water is consumed and so on. The depressed buttons, now in the second state or second configuration, serve as a visual reminder that a certain number of tasks or events have been completed. When an activity or time period is completed, the user can reset the device by articulating necessary buttons from the second state to the first.

One embodiment is a wearable device having a band and a plurality of buttons around or on the band that may be selectively and repetitively articulated by a user between a first state and a second state. In this embodiment, the band is formed as a loop sized to fit over a user's wrist. The band may be fabricated from a flexible, elastomeric material. In some embodiments, the plurality of buttons is co-formed in the band and of the same material as the band, with circular buttons being positioned along a circumferential centerline around the band.

The shape or configuration of a button may indicate whether the button is currently in the first state or second state. For example, a button may be in the first state when the outer button surface has a convex surface profile. Pressing on the outer button surface may cause the button to pop down into a concave surface profile showing that the button is in the second state.

The buttons may include a separate insert material embedded in the band at the position of each button, between the inner button surface and the outer button surface. An insert material may facilitate the ability of a button that is co-formed with the band to hold its shape in the first and second configurations respectively. In addition, an insert material can provide additional tactile or audible feedback to a user when the button is articulated from the first state to the second state, and when the button is articulated from the second state to the first state. In some embodiments, a button may change color when articulated by a user between the first state and the second state.

Alternative embodiments include methods of remembering a series of events, counting events or milestones or otherwise using the device disclosed herein.

BRIEF DESCRIPTION OF THE DRAWINGS

FIG. 4A is an enlarged isometric view of a button of the wearable memory aid device of FIG. 1. Showing section line A-A.

FIG. 4B is a schematic cross-sectional view of one embodiment of button in a first state, taken a long section line A-A of FIG. 4A.

FIG. 4C is a schematic cross-sectional view of one embodiment of button in a second state, taken along section line A-A of FIG. 4A.

DETAILED DESCRIPTION

Unless otherwise indicated, all numbers expressing quantities of ingredients, dimensions, reaction conditions and so forth used in the specification and claims are to be understood as being modified in all instances by the term "about".

In this application and the claims, the use of the singular includes the plural unless specifically stated otherwise. In addition, use of "or" means "and/or" unless stated otherwise. Moreover, the use of the term "including", as well as other forms, such as "includes" and "included", is not limiting. Also, terms such as "element" or "component" encompass both elements and components comprising one unit and elements and components that comprise more than one unit unless specifically stated otherwise.

Figure 1:
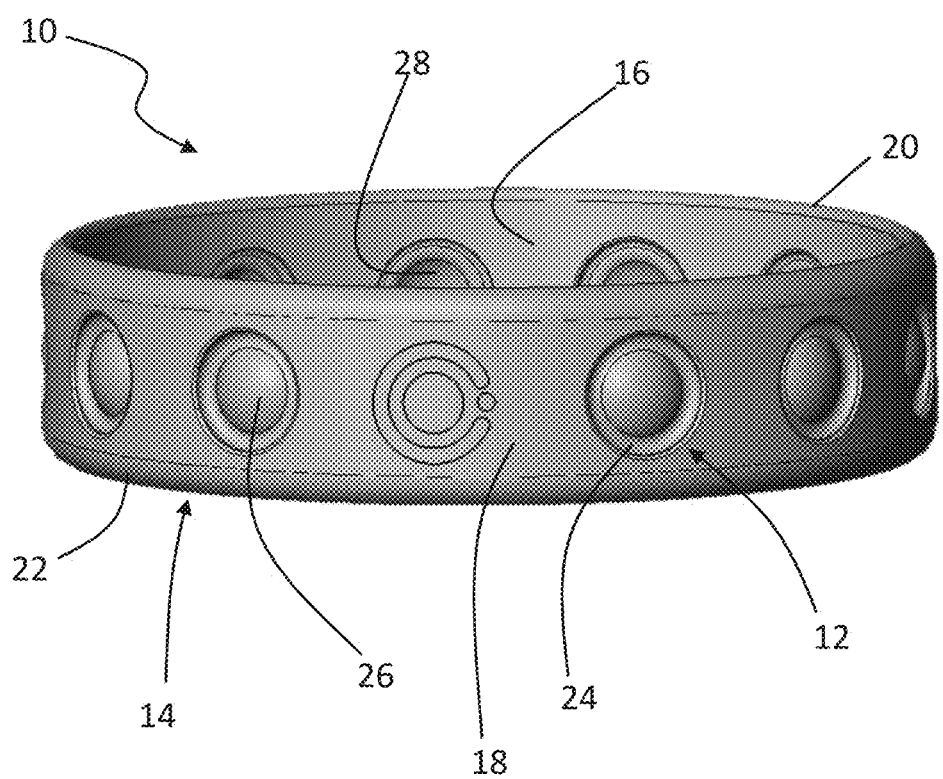
FIG. 1 is an isometric view of a wearable memory aid device as disclosed herein.
Figure 2:
FIG. 2 is an alternative isometric view of the wearable memory aid device of FIG. 1.
Figure 3:
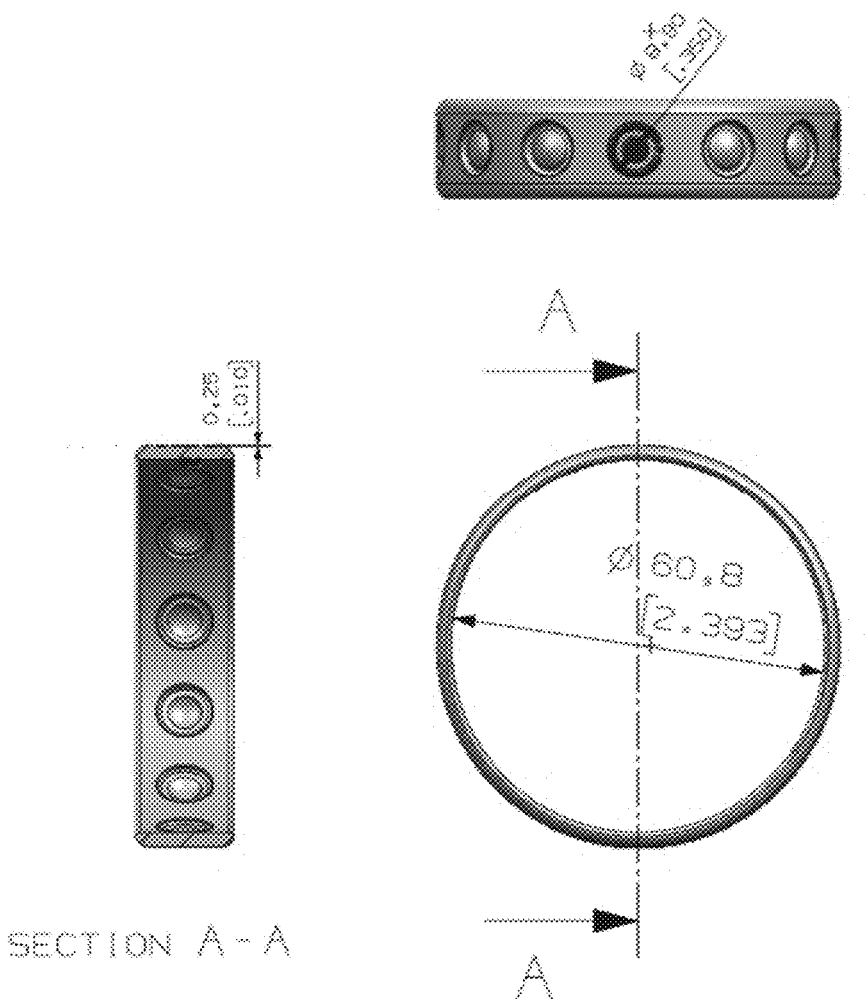
FIG. 3 includes side elevation, side cross-section, and plan views of the wearable memory aid device of FIG. 1.

One embodiment is wearable memory aid or activity tracking device 10 as shown in FIGS. 1-3. The wearable memory aid or tracking device 10 is generally referred to herein as "device 10." As detailed below, the device 10 includes a plurality of buttons 12 that may be manually articulated by a user from a first state to a second state to conveniently track the occurrence of events or to count activities. Activities or events may be tracked over any selected period of time, for example a day, a week, an hour, or another chronological time period. Alternatively, events may be tracked during an activity, for example, while at the gym, after school, during a golf hole, or the like. The device 10 is suitable for use by people of any age. Users of the device 10 are collectively referred to herein as "users."

The buttons 12 positioned on the device 10 are articulable by the user between a first state or first configuration, and a second state or second configuration. Articulating a button from the first state to the second state may visually represent or record an activity, event, or task being completed. Alternatively, articulating a button from the first state to the second state can represent a milestone being achieved. Thus, the device 10 serves as a simple, wearable, easy to use memory aid. The device 10 includes no electronic elements and requires no power source. The device 10 may be used to track any type of event, series of events, task, or milestone, without limitation.

For example, an adult user may need to remember to take medications several times a day. Children might be asked to remember to complete their homework, feed the family dog, and pick up their rooms, before they have play time. A golfer must count the strokes taken during each hole of a round of golf. Others may desire to count repetitions at the gym, count laps around the pool, or count the number of glasses of water consumed each day during a diet. The device 10 may be used to track, count, or otherwise remind the user of the status of any activity, event, or task being undertaken.

The specific embodiment of the device 10 shown in FIGS. 1-3 includes a band 14 configured as a loop sized to fit over a user's wrist. Alternative embodiments can be sized to fit over user's ankle, finger, or other body part. The band 14 may optionally include any type of buckle, button, or other connector. Other alternative embodiments can be configured as part of a user's clothing or as an accessory to a user's clothing, hat, suspenders, belt, bags, exercise equipment, and the like.

The device 10 may include any convenient number of buttons 12 so that several tasks, events, milestones, or the like may be tracked or counted during the selected activity or time period. The illustrated device 10 includes a series of circular buttons formed in the band, with each of the buttons being positioned along a circumferential centerline around the band. Other button configurations are within the scope of this disclosure.

The band 14 of FIGS. 1-3 includes an inner band surface 16 that in use faces the user's wrist. The band 14 also includes an outer band surface 18 that in use faces outward away from the user's wrist. In the illustrated embodiment, the band is relatively thin between the inner band surface 16 and the outer band surface 18, thus the band 14 also includes two edges between the surfaces 16, 18. The edges 20, 22 may be rounded, chamfered, eased or otherwise treated or formed to enhance user comfort. In certain embodiments, the band 14 is formed of a flexible, and/or elastomeric material to facilitate placing the band 14 over a user's wrist. For example, the band 14 may be fabricated from an elastomeric rubber, synthetic rubber, plastic, silicone, or similar material. The band 14 may be formed to include any desired logos, inspirational statements, or other indicia.

As noted above, each button 12 can be articulated into one of two alternative states. These states can correspond to "yes" and "no" or "completed" versus "not completed" or a similar binary reminder to the user. It is desirable that the buttons be easy to articulate, durable, relatively failure proof, waterproof, and in certain embodiments, capable of providing tactile, audible or enhanced visual feedback to the user. The buttons 12 of FIGS. 1-3 are each co-formed in the band 14 and fabricated at least in part from the band material. Separately formed buttons 12 attached to the band 14, after the band 14 has been fabricated, may be used in alternative embodiments.

The specific buttons 12 shown in the figures are circular in the planes defined by the inner band surface 16 and outer band surface 18, respectively. Other button shapes are within the scope of this disclosure. As noted above, the buttons 12 are co-formed or co-molded with the band 14, therefore, a button 12 is defined by an outer button surface 26 contiguous with the outer band surface 18 and an inner button surface 28 contiguous with in the inner band surface 16. The buttons 12 may be distinguished from the band 14 by the surface profile of the button and/or color.

The buttons 12 illustrated in FIGS. 1-3 are shown in the first or initial state. In this state, the outer button surface 26 has a circular, convex surface profile arching generally upward away from the user's wrist. As shown in FIG. 4B, a button 12 is meniscus shaped in cross-section, therefore the inner button surface 28 has a concave surface profile, also arching generally away from the user's wrist while the button 12 is in the first or initial state. When a user presses upon the outer button surface 26 to articulate the button into the second state, the inner and outer button surfaces 26 and 28 snap downward, reversing the curvatures described above. Thus, in the second state, as illustrated in FIG. 4C, the outer button surface 26 has a concave surface profile extending toward the user's wrist at the center of the button 12, while the inner button surface 28 now has a convex surface profile, also extending toward the user's wrist.

Each button is fabricated to remain in the secondary state after it has been depressed, until the user resets the button to the first state by pressing upon the inner button surface 28. The ability of a button to hold its shape in the first or second state, and the overall action of a button may be enhanced by including an insert material 30 embedded in the band between the outer button surface 26 and the inner button surface 28. The insert material may have a meniscus shaped region of a relatively thin section of metal, bimetallic material, plastic, polymer, or similar material underlying each button. The insert material may thus provide a readily appreciable click or pop when a button is articulated from the first state to the second state. The click or pop provided by the insert material therefore provides tactile and in certain instances audible feedback to a user indicating that a button has been either articulated or reset.

In the embodiments described above, the general shape of the button provides visual feedback concerning the state of each button. For example, a convex outer button surface 26 provides a visual indication of said button being in the first state. A concave outer button surface shows the button being in the second state. Any surface profile defining a button in each state is within the scope of this disclosure. In addition, the band 14, or the buttons 12 may be fabricated from a pressure sensitive polymer having a first color in the first state and a second color in the second state.

Figure 5:
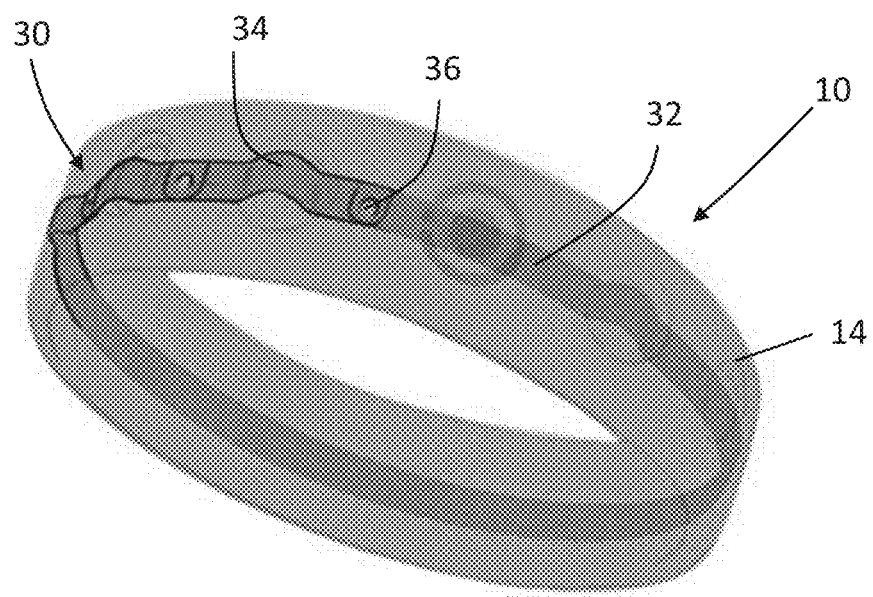
FIG. 5. is a perspective view of the wearable memory aid device of FIG. 1 with the band rendered as a transparent structure, showing one embodiment of internal insert material.
Figure 6:
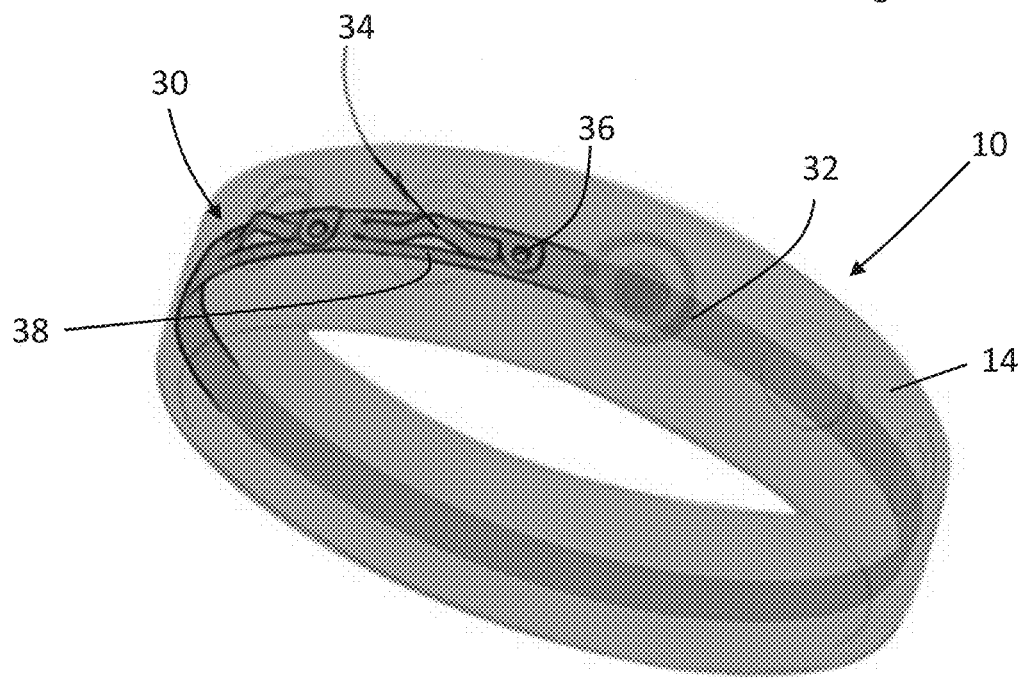
FIG. 6. is a perspective view of the wearable memory aid device of FIG. 1 with the band rendered as a transparent structure, showing an alternative embodiment of internal insert material.
Figure 7:
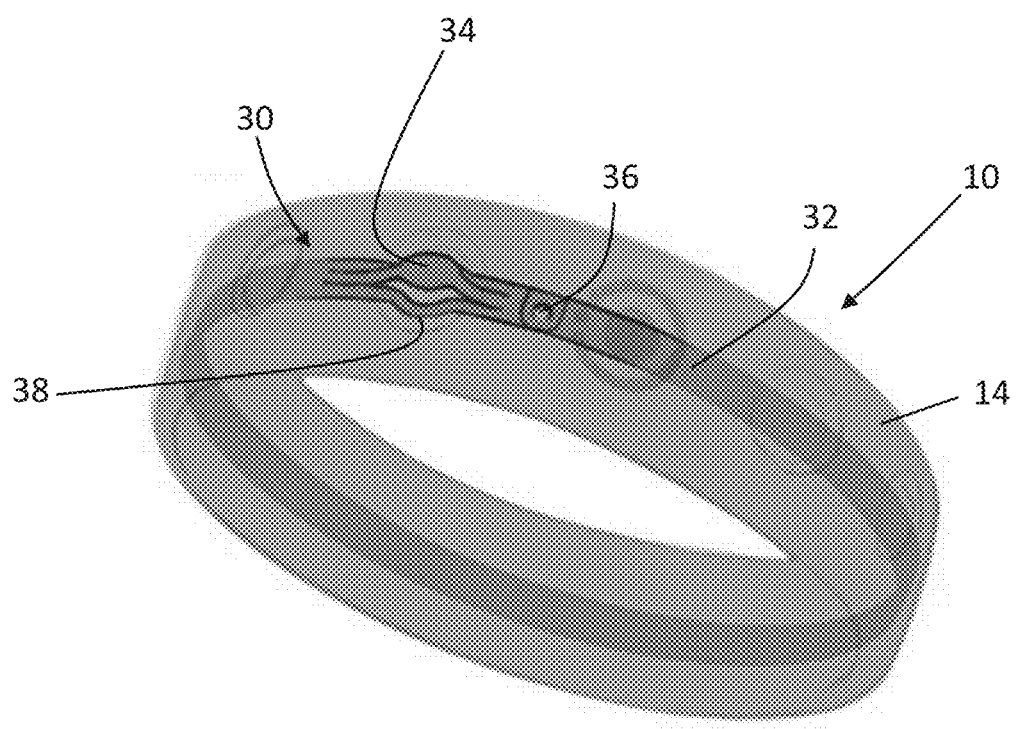
FIG. 7. is a perspective view of the wearable memory aid device of FIG. 1 with the band rendered as a transparent structure, showing an alternative embodiment of internal insert material.

As noted above, certain embodiments of the device 10 can include an insert material 30 embedded in the band between the outer button surface 26 and the inner button surface 28. FIGS. 5-9 illustrate representative insert materials and ancillary structures. Specifically, FIGS. 5-7 illustrated embodiments having a circumferential reinforcing element 32 embedded in the band between both the outer band surface 18 and inner band surface 16 and the outer button surface 26 and the inner button surface 28. Thus, the circumferential reinforcing element 32 underlies the centrally disposed buttons 12 around the band 14. The circumferential reinforcing element 32 may be fabricated with a relatively thin sheet or film of metal, bimetallic material, plastic, polymer, or similar material. Therefore, the circumferential reinforcing element 32 can, in certain embodiments, provide structural support to the entire band 14. Typically, the central reinforcing element 32 will be fabricated from a material, such as metal, having significantly greater rigidity than the material used to fabricate the band 14.

As shown in FIGS. 5-9 the circumferential reinforcing element may be formed in the region of a button 12 to enhance button functioning. For example, the embodiment illustrated in FIG. 5 includes a series of arches 34 formed in the circumferential reinforcing element 32. One arch 34 underlies each button 12. In the first state, where the button 12 presents a convex surface at the outer button surface 26, an arch 34 is curved in a convex manner toward the outer button surface 26. When the button is articulated, the curvature of the arch 34 reverses such that the outer button surface 26 is concave. The portions of the circumferential reinforcing element 32 between the arches 34 serves to keep each arch centered within the band 14 at the region of each button 12. The circumferential reinforcing element 32 may be a monolithic structure. Alternatively, the circumferential reinforcing element 32 may be constructed from a strip having a series of arches, with the strip being formed into a loop with a rivet 36 or other suitable connection. Alternatively, the circumferential reinforcing element 32 may be fabricated from short segments including one or more arches 34 that are connected together with a series of rivets 36, as shown in FIG. 5.

In the FIG. 5 embodiment, the entirety of the circumferential reinforcing element 32 at the region of a button 12 is formed into an arch 34. Alternatively, as shown in FIG. 6, an arch 34 may be formed from a central or other portion of the circumferential reinforcing element 32 with side portions 38 not being formed into an arch. The FIG. 7 embodiment is similar, with a broadened arch 34 and expanded side portions 38 to more closely match the contour of a circular button 12. The embodiments of FIGS. 6 and 7 may provide enhanced tactile feedback to a user when the buttons are articulated. Furthermore, the FIGS. 6 and 7 embodiments may, because of tension provided by the side portions 38, have arches 34 that more readily remain in the selected state until reset or re-articulated.

The embodiments of FIGS. 8 and 9 include two parallel circumferential reinforcing elements 32 joined together at the region of the buttons 12. As described above, the two parallel central reinforcing elements 32 are embedded within the band 14 between the inner band surface 16 and outer band surface 18. The two parallel circumferential reinforcing elements 32 may be fabricated of a relatively thin section of metal, bimetallic material, plastic, polymer, or similar material. Therefore, the circumferential reinforcing elements 32 can, in certain embodiments, provide structural support to the entire band 14.

Figure 8A:
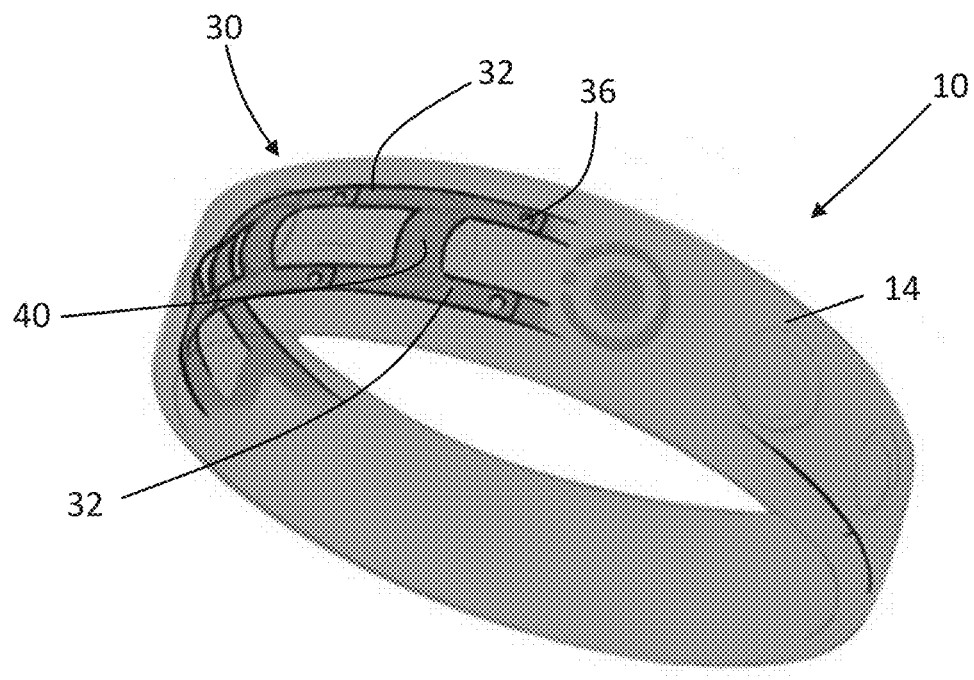
FIG. 8A. is a perspective view of the wearable memory aid device of FIG. 1 with the band rendered as a transparent structure, showing an alternative embodiment of internal insert material.
Figure 8B:
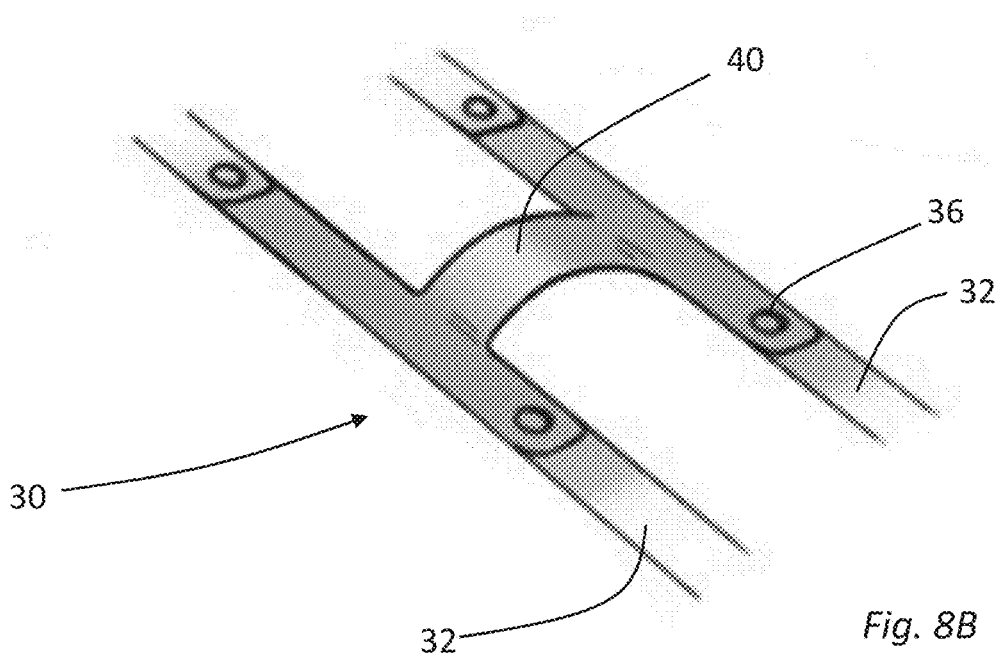
FIG. 8B. is a perspective view of a portion of the internal insert material of FIG. 8A.

In the embodiment illustrated in FIGS. 8A and 8B, the two parallel central reinforcing elements 32 are joined at some or all button regions with a series of transverse arches 40 formed between the two parallel circumferential reinforcing elements 32. One transverse arch 40 is positioned within each button 12, between the inner and outer button surfaces, 28 and 26 respectively. In the first state, where the button 12 presents a convex surface at the outer button surface 26, the associated transverse arch 40 is curved in a convex manner toward the outer button surface 26. When the button is articulated, the curvature of the transverse arch 40 reverses such that the outer button surface 26 is concave. The two parallel circumferential reinforcing elements 32 serves to keep each transverse arch 40 centered within the band 14 at the region of each button 12. The two parallel central reinforcing elements 32 also serve to compress the transverse arch 40 somewhat, assuring that the transverse arch 40 stays in the selected first or second position until reset or re-articulated. The circumferential reinforcing elements 32 may be monolithic structures. Alternatively, the circumferential reinforcing elements 32 may be constructed from segments of greater or lesser length being formed into a loop with one or more rivets 36 or other suitable connections.

Figure 9A:
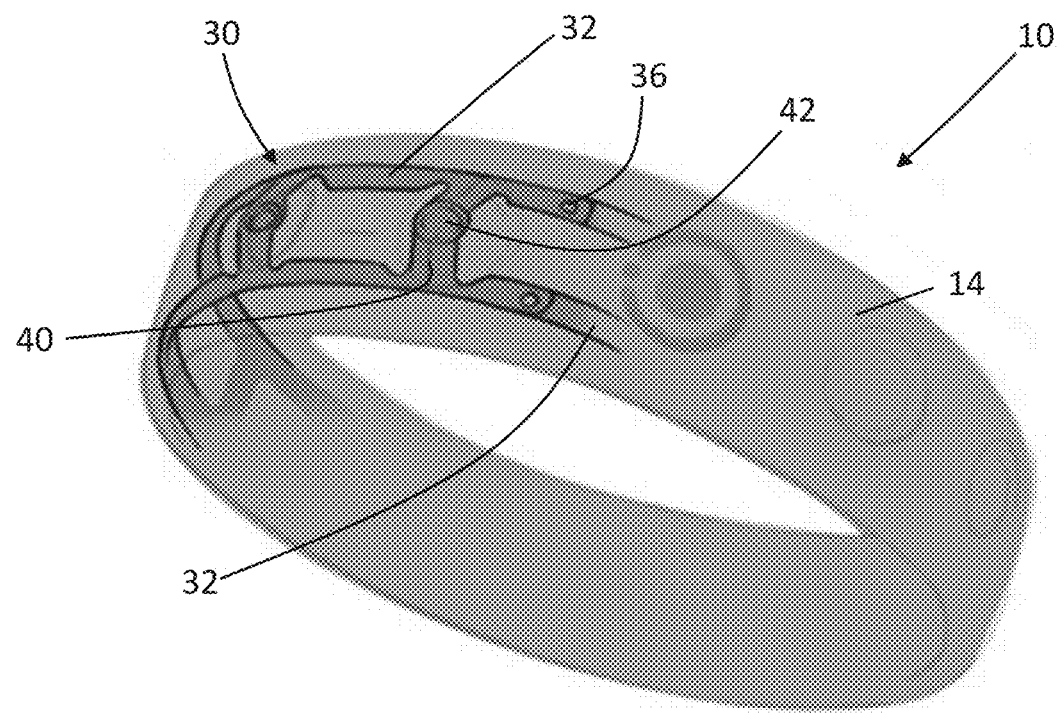
FIG. 9A. is a perspective view of the wearable memory aid device of FIG. 1 with the band rendered as a transparent structure, showing in alternative embodiment of internal insert material.
Figure 9B:
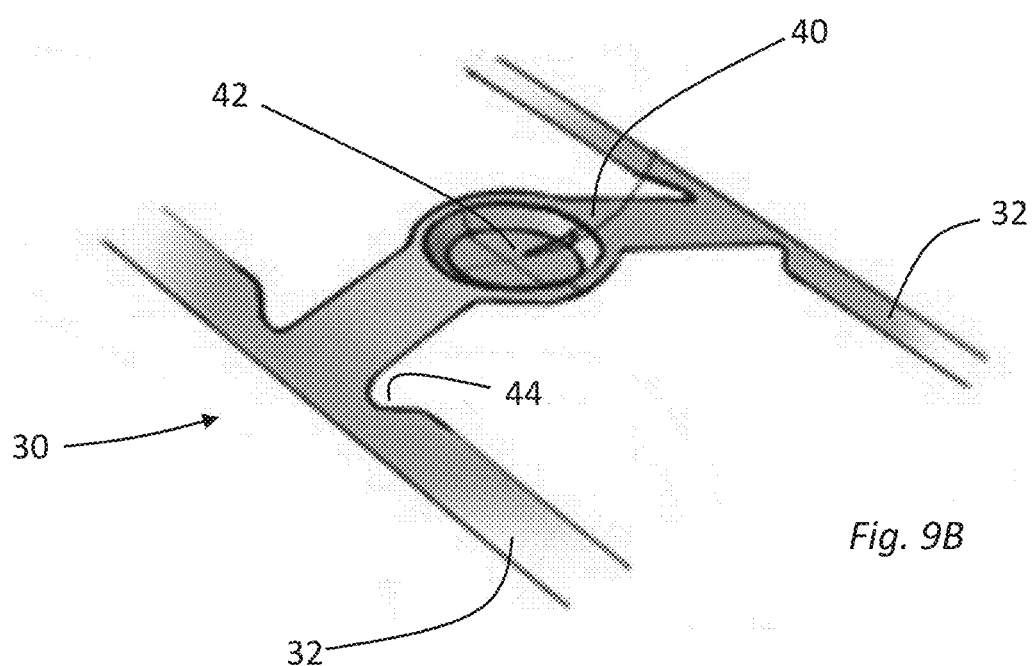
FIG. 9B. is a perspective view of a portion of the internal insert material of FIG. 9A.

The embodiment of FIGS. 9A and 9B includes a central depression 42 formed within the transverse arch 40 that is positioned within the band 14, between the outer button surface 26 and inner button surface 28. The transverse arch 40 of FIG. 9 operates as described above and can be snapped from a first position, illustrated in FIG. 9, to a second position and back again, with the central depression 42 enhancing the tactile feedback provided by a button 12. As shown in FIG. 9B, the connection between a transverse arch 40 and the associated parallel circumferential reinforcing elements 32 in any embodiment may include curved edges 44 or otherwise be formed to reduce sharp corners, enhance the durability of a device 10, and enhance the tactile feedback provided by button articulation.

Alternative embodiments include methods of remembering a series of events, counting events or milestones or otherwise using any embodiment of the device 10 as disclosed above.

Various embodiments of the disclosure could also include permutations of the various elements recited in the claims as if each dependent claim was a multiple dependent claim incorporating the limitations of each of the preceding dependent claims as well as the independent claims. Such permutations are expressly within the scope of this disclosure.

While the invention has been particularly shown and described with reference to a number of embodiments, it would be understood by those skilled in the art that changes in the form and details may be made to the various embodiments disclosed herein without departing from the spirit and scope of the invention and that the various embodiments disclosed herein are not intended to act as limitations on the scope of the claims. All references cited herein are incorporated in their entirety by reference.

What is claimed is:

1. A wearable device comprising:
   a band; and
   a plurality of buttons operatively associated with the band; wherein the plurality of buttons may be selectively and repetitively articulated by a user between only a first state and a second state, wherein the first state and the second state are visually distinguishable from each other, wherein a portion of the plurality of buttons is co-formed with the band and of the same material as the band, said buttons comprising an outer button surface contiguous with the outer surface of the band and an inner button surface formed contiguous with the inner surface of the band.

2. The wearable device of claim 1 wherein the band comprises a loop sized to fit over a user's wrist, said loop comprising an inner band surface, an outer band surface and two side edges.

3. The wearable device of claim 1 wherein the band comprises a flexible, elastomeric material.

4. The wearable device of claim 1 wherein each of the buttons is a circular button formed in the band, and wherein each of the buttons is positioned along a circumferential centerline around the band.

5. The wearable device of claim 1, wherein the outer button surface has a convex surface profile when the button is in the first state, and wherein the outer button surface has a concave surface profile when the button is articulated into the second state.

6. The wearable device of claim 1, wherein the inner button surface has a concave surface profile when the button is in the first state, and wherein the inner button surface has a convex surface profile when the button is articulated into the second state.

7. The wearable device of claim 1 wherein the plurality of buttons further comprises a separate insert material embedded in the band at the position of each button, between the inner button surface and the outer button surface.

8. The wearable device of claim 7, wherein the insert material provides tactile feedback to a user when the button is articulated from the first state to the second state, and when the button is articulated from the second state to the first state.

9. The wearable device of claim 7, wherein the insert material provides audible feedback to a user when the button is articulated from the first state to the second state, and when the button is articulated from the second state to the first state.

10. The wearable device of claim 1 wherein each of the plurality of buttons changes color when articulated by a user between the first state and the second state.

11. A method of tracking a series of events comprising:
    providing a wearable device comprising:
       a band; and
       a plurality of buttons operatively associated with the band; wherein each of the plurality of buttons may be selectively and repetitively articulated by a user between only a first state and a second state, wherein the first state and the second state are visually distinguishable from each other, wherein a portion of the plurality of buttons is co-formed with the band and of the same material as the band, said buttons comprising an outer button surface contiguous with the outer surface of the band and an inner button surface formed contiguous with the inner surface of the band; and
    articulating a first button from the first state to the second state upon the occurrence of a first event.

12. The method of tracking a series of events of claim 11 further comprising articulating a second button from the first state to the second state upon the occurrence of a second event.

13. The method of tracking a series of events of claim 12 further comprising resetting the first button and the second button from the second state to the first state.

14. The method of claim 13 further comprising resetting the first and second buttons after the completion of a used selected time period.

15. The method of claim 13 further comprising resetting the first and second buttons after the completion of an activity.

* * * * *